May 29, 1956 P. EISLER 2,747,977

METHOD OF MAKING PRINTED CIRCUITS

Filed July 15, 1952

*Inventor*

Paul Eisler

By Frederick E. Hang

*Attorney*

United States Patent Office 2,747,977

Patented May 29, 1956

2,747,977

METHOD OF MAKING PRINTED CIRCUITS

Paul Eisler, London, England, assignor to Technograph Printed Circuits Limited, London, England, a company of Great Britain Application July 15, 1952, Serial No. 298,963

Claims priority, application Great Britain July 16, 1951

22 Claims. (Cl. 41—43)

Figures 1, 2, 3, 4, 5:
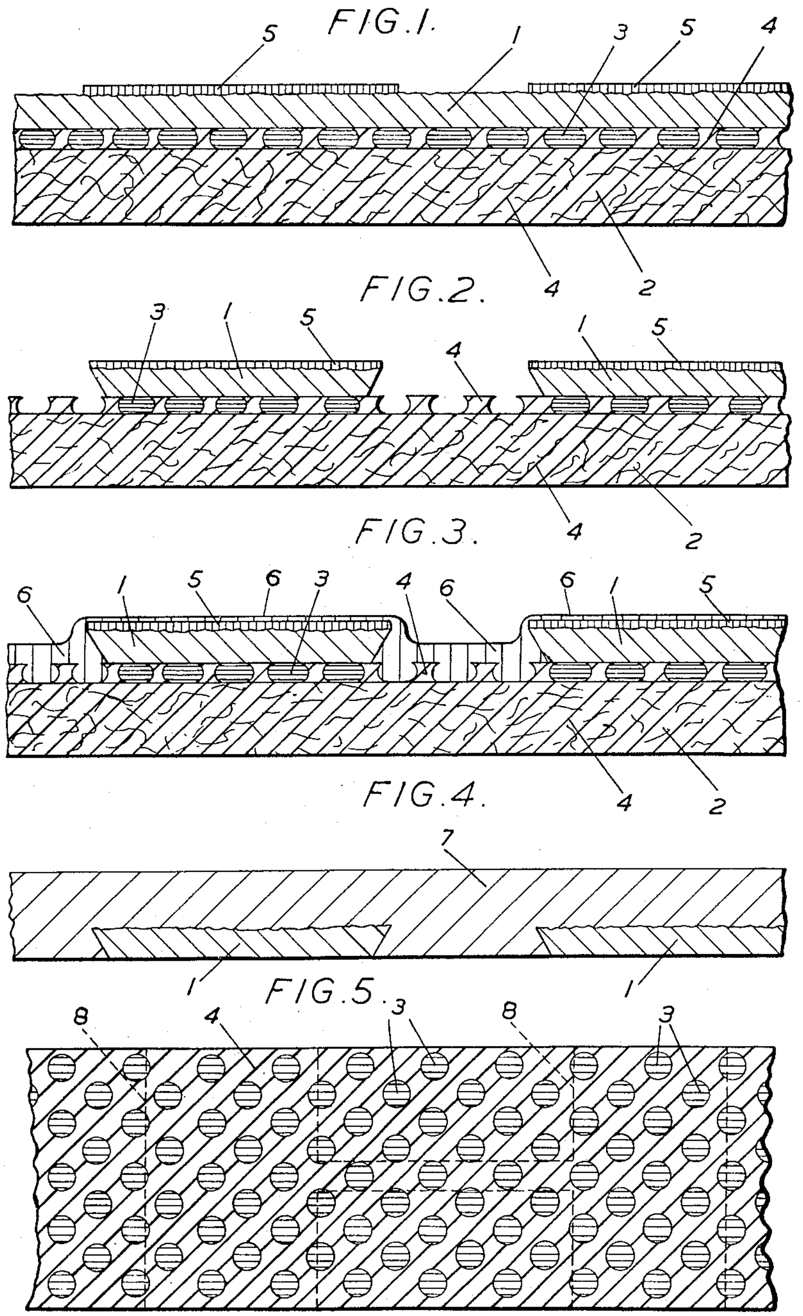

This invention relates to printed electric circuits in which a thin conductive pattern is supported on a support.

The conductive pattern is conveniently secured to the support by an adhesive layer and it is with the nature of this layer that the present invention is more particularly concerned.

An ideal adhesive layer should have several special characteristics. Thus it should be capable of being applied as a liquid; it should be capable of withstanding the action of electrolytes, such as acids, alkalis, or electroplating solutions, which may be employed in the creation of the conductive pattern or in other treatments of the circuit material; it should be heat resistant, that is to say, it should retain its properties at temperatures which may be experienced in soldering circuit components or conductors to the conductive pattern or in plastic moulding operations for transferring the conductive pattern from a temporary support to a permanent support as hereinafter described, it should be capable of acting as a mould release agent, that is to say a barrier layer between the material of the support and the plastic material during such transferring moulding operations, it should be capable of being dissolved, softened or otherwise rendered ineffective by a solvent or other agent which does not attack the materials of the support or the conductive pattern; and finally it should be relatively inexpensive.

It is believed that no known adhesive material possesses all these desirable characteristics.

According to the present invention a method of manufacturing a printed circuit includes providing an adhesive layer between the conductive pattern (or a sheet of conductive material from which the conductive pattern is to be created) and a support therefor, which layer, in the course of manufacture of the printed circuit, contains simultaneously or successively at least two different adhesive substances, at least one of which is heat resistant as hereinbefore defined, at least one other of which is capable of withstanding the action of such electrolytes as may be used to treat the circuit material, and at least one of which can be rendered ineffective by an agent which will not affect another of the adhesive substances.

Conveniently the support consists of a strip of fibrous material, such as cloth or paper, which is porous at least during part of the process of manufacture. One reason for this is that it enables an adhesive to be used in liquid form without necessitating a lengthy drying of the adhesive coating before the materials to be joined are brought together, which would otherwise be necessary in order to avoid the risk of trapping volatile constituents of the adhesive and so forming bubbles in the adhesive layer. By using a porous fibrous support the volatile constituents of the adhesive layer can evaporate through the pores as the adhesive substance solidifies.

Thus, for applying the adhesive, existing web-fed coating and laminating machines may be used, which have no facilities for lengthy drying of the coating prior to laminating together the conductive material and the support.

The fibrous support may subsequently be impregnated, to close the pores, with an impregnant which is capable of withstanding the action of such electrolytes as may be used to treat the circuit material and which constitutes part of the adhesive layer. When so impregnated the fibrous support may serve to protect one surface of the conductive material against the action of, say, an etching medium employed for removing unwanted areas of the conductive material. In such a treatment, therefore, the areas of the conductive material which are to remain require to be specially masked by an etch resist only on the surface which is remote from the support.

A fibrous support, when suitably impregnated, may constitute a permanent support for the printed circuit, the impregnant preferably being such that the circuit is flexible.

A fibrous support such as cloth or paper is also suitable for use as a temporary support on which a conductive pattern may be created and from which it may then be transferred to a permanent moulded plastic support by moulding the latter on to and around the conductive pattern.

For economic production it is often desirable to create numerous conductive patterns on a continuous temporary strip support, and since a continuous moulding operation is seldom practicable, it is necessary to sever the temporary strip support between individual patterns or groups of patterns for the moulding operation. This means that the temporary support cannot be re-used as such. Cloth or paper is therefore eminently suitable for the temporary support, since it is relatively inexpensive and is readily obtainable in strip form.

Thus by using a porous fibrous support the same plant can be used for making the conductive patterns irrespective of whether they are to remain permanently on the support or whether they are to be transferred to another support.

When the pattern is to be transferred from a porous fibrous temporary support to a permanent support by a plastic moulding operation, measures should be taken to prevent the plastic material from penetrating the pores of the fibrous temporary support and thus hindering the removal of the latter after the moulding operation has been completed. Such measures conveniently comprise impregnating the fibrous material with an adhesive substance which also acts as a mould release agent.

Reference has been made above to the fact that the adhesive layer may contain the different adhesive substances either simultaneously or successively. Where the substances are present simultaneously the structure of the layer will be such that portions of both substances lie side by side in the adhesive layer during some or all of the processing steps for making the printed circuit. Where two or more different substances are contained successively in the adhesive layer, they may be exchanged one for the other at an appropriate stage in the processing of the printed circuit. In practice both systems may be used in the manufacture of a printed circuit, in different processing steps, as will appear from examples given below.

In carrying out the invention it may be desirable that certain areas of the adhesive layer shall not contain one of the adhesive substances. If so, on the material to which this adhesive substance is to be applied the areas which are to remain free from this adhesive substance may be protected by a coating prior to applying the adhesive substance, the nature of the protective coating being such that it will repel the adhesive substance. If desired, the protective coating may comprise another adhesive substance. The protective coating may be only temporary, and may be removed after application of the first mentioned adhesive substance, by treating the adhesive layer with an agent which dissolves or otherwise attacks the protective coating but not the said adhesive substance. Removal of the protective coating ensures that any part of the said adhesive substance which may have clung to the protective coating will be removed also, thereby ensuring that the areas which had been protected by the coating shall be entirely free from the said adhesive substance.

Another method of ensuring that certain areas of the adhesive layer shall not contain one of the adhesive substances, being one that is capable of being modified as to its solubility or melting point by the action of a modifying agency such as light or heat, comprises applying a substantially uniform coat of this adhesive substance, masking off the said areas (or masking off the rest of the coat apart from these areas, if more appropriate), applying the modifying agency so that exposed areas of the coat are modified, and then selectively removing the modified or unmodified parts of the coat.

Where two or more of the adhesive substances are to be present simultaneously in the adhesive layer, at least one adhesive substance may be applied as small discrete globules, and these globules may be surrounded by a coherent matrix of another adhesive substance.

The globules may be applied in various ways. For instance, they may be formed by applying a spray of the adhesive substance in the form of a liquid of such high viscosity that under the spraying conditions employed it does not form a coherent film, which it would do under the same spraying conditions if the viscosity were lower.

Alternatively, the adhesive substance may be applied as a liquid film which is so thin that it is unstable and breaks up into globules. The thickness of film required to produce this effect will vary with the circumstances and the nature of the adhesive substances, but will generally be less than $20\mu$, and sometimes less than $10\mu$.

A further method is to disperse the adhesive substance in a volatile medium in which it is insoluble, controlling the conditions of dispersion so that the adhesive particles in the dispersion are of the required size for the globules, coating the dispersion over the surface to which the adhesive layer is to be applied, and allowing the volatile medium to evaporate.

Again, where the adhesive layer is to be applied to a metal surface (e. g. a sheet of metal foil from which the conductive pattern is to be created), the surface of the foil may first be treated to become repellent to one of the adhesive substances to be applied thereto, whereby when this substance is applied it is forced into the desired globular structure by surface tension effects. Suitable agents for treating the foil comprise hydrolysed methyl silicone chloride, chlorinated and/or fluorinated hydrocarbons such as fluorinated methylanthracene, solutions of certain fatty acids such as oleic acid in benzene, and solutions of certain water-repellent metal soaps such as ferric stearate in benzene.

By applying the lithographic principle a grid-like pattern or mesh may be printed or otherwise applied to the metal surface in a fatty or other water-repellent ink, thus ensuring that a watery adhesive coating will only adhere to the metal surface in the interstices of the pattern or mesh.

With a globular structure of the adhesive layer, the adhesive substance which is in the form of globules may be heat-resistant, while another adhesive substance surrounding the globules is resistant to such electrolytes as may be used for treating the circuit material, e. g. an etching medium used in the creation of the conductive pattern from a sheet of metal foil.

The heat-resistant adhesive substance may be water-soluble or otherwise susceptible to attack by the electrolyte. For instance, it may be an organic colloid such as starch or dextrin.

The adhesive substance which is resistant to electrolytes need not be heat-resistant and may serve as an impregnant for the support. For example, it may be wax.

Adhesive substances suitable for use as mould-release agents must be heat-resistant but need not be resistant to electrolytes. Such substances include bichromated gum arabic.

In order to illustrate the invention, the following example is given of a process embodying the invention, for providing a thin metallic pattern in the surface of a moulded plastic article.

Prior to the creation of the pattern, a composite strip is formed comprising a metal foil secured by an adhesive layer to a strip of porous paper. The pattern is then created in the metal foil by a known printed circuit technique, such as printing with an ink resist followed by chemical etching as described for example in U. S. patent specification No. 2,587,568. In order to withstand the heat and pressure experienced during the subsequent moulding operation, which may be say 130° C., and 1½ tons per square inch in the case of a typical phenol-formaldehyde moulding, the adhesive layer must be heat-resistant, but the most satisfactory cheap adhesives from this point of view, such as starch or dextrin-type adhesives, lose their efficacy when wetted. Thus the bond between the metal foil and the paper would be destroyed during the etching treatment for creating the pattern, involving a risk of distortion of the pattern, unless special steps were taken to prevent this. These special steps comprise applying a heat-resistant adhesive substance such as a starchy adhesive in the form of minute discrete globules for instance by spraying as described above. After the foil and the paper have been stuck together the paper is impregnated from the back, as in usual paper impregnating processes, with an etch-resistant adhesive substance such as a synthetic or natural resin, a drying oil or a wax. A convenient and preferred impregnant is molten paraffin wax and this is used in the present example. This wax penetrates right through the paper and encloses the individual globules of the "heat-resistant" adhesive substance, in this case the starch, thus protecting these globules from the action of the etching medium for instance a ferric chloride solution of 33° Bé. at about 45° C., which is used in the creation of the pattern in the foil. During the impregnating step it is of course important to prevent the wax from coming into contact with the outer surface of the metal foil. A convenient way of doing this is to apply the wax by a wax-coater machine. Alternatively the foil may be masked during the impregnation.

Although the steps mentioned above solve the problems of adhesion and etching, there is the further difficulty that during the moulding operation the plastic material may penetrate the exposed area of paper and so hinder the subsequent removal of the paper support. In order to prevent this the metallised side of the paper, prior to the moulding operation, may be coated with a thin layer of a further adhesive substance consisting for instance, of a solution of polyvinyl alcohol, sodium alginate or sodium silicate, or a protective colloid such as gum or gelatine. Gum arabic is preferred. Since the gum arabic layer will extend over the whole of this surface, i. e. over the metal pattern as well as over the exposed areas of paper, it is necessary to remove the gum arabic from the metal areas. The layer of gum arabic will be thinner over the metal areas than over the paper areas (since the metal stands proud of the paper surface) and the thin portions will in many cases crack as they dry. If the ink resist employed for protecting the metal during the creation of the pattern has not been removed before the gum arabic is applied, the gum arabic layer can be swabbed with ink-remover such as paraffin which will penetrate the cracks in the gum arabic and dissolve the underlying ink resist.

As the ink resist is dissolved, the gum arabic overlying it will also come away, to expose the metal pattern. Another way of removing the gum arabic from the metal areas is to include magnetic particles in the ink resist and to run a magnet over the surface when the gum arabic is nearly dry, so as to draw up these particles and perforate the gum arabic layer. Alternatively, a cracking lacquer technique may be used which first causes the ink or another layer over the metal areas to swell, for instance by placing the printed and etched sheet in the vapour of an ink solvent or swelling agent. The bare areas will be dry before the ink film is fully shrunk back and the gum coating is applied at this stage. The ink film shrinks as it dries further and so causes cracks to develop in thin layers of gum arabic adjacent thereto. Another way is to pass a high-frequency electrostatic field over the surface between two electrodes. Where there is no underlying metal the dielectric path will be large and the electrostatic heating thereof will not be great. On the other hand, over the metallised areas there will only be a thin layer of dielectric material, so that the electrostatic heating thereof will be substantially greater and will cause it to crack or melt.

Another way of dealing with the problem of penetration of the moulding material into the pores of the paper is to use a waxed paper support which is transparent to ultra-violet light, and to coat the whole area of the metallised side of the paper, either before or after the removal of the etch-resistant ink, with an adhesive substance which hardens when exposed to ultra-violet light, such as bichromated gum arabic or gelatine. A hardening agent such as alum or formaldehyde may be impregnated in the paper if desired, or used later on, in the washing out stage. The coating is dried in darkness and is covered with a sheet of opaque material, preferably white or any colour which is a good reflector of ultra-violet light. The coated paper is then exposed to ultra-violet light from the back. In the metallised areas the ultra-violet light cannot penetrate to the coating, so the coating over the metallised areas remains soft. In the areas where there is no metal, however, the ultra-violet light acts on the coating and hardens it. After this treatment the opaque sheet is removed, and the soft coating is washed off the metal areas. On the other areas the hardened coating is not washed off, and remains as an anti-adhesive film over the paper. If the etch-resistant ink had not previously been removed from the metal areas, it can be removed freely after the soft coating has been cleared away. By dyeing the gum either initially or in the washing out stage visual control of the process is assisted.

If the impregnant introduced into the paper in an earlier stage is also capable of acting as a mould-release agent, the necessity for providing a special anti-penetration protective coating may be avoided. Certain silicone compounds, for instance, would be suitable, but at present such compounds are relatively costly.

In order to ensure that the metal patern does not pull away from the moulding when the temporary support is being removed, a suitable solvent may be applied to the paper for softening the adhesive remaining between the paper and the metal surface. The risk of pulling away the metal pattern may also be reduced by treating its rear surface, and in some cases the edges also, to provide a good bond between the metal and the plastic.

In cases where the metal pattern has been created by an etching or plating treatment its edges will usually be somewhat undercut. This undercutting is of value in that the metal pattern, after transfer, is keyed into the surface of the plastic moulding. The use of a grained and/or over all undercut metal foil surface, such as can be produced by etching, abrasive blasting, or plating, also helps to key the metal pattern into the plastic moulding. The other side of the metal foil is preferably smooth. It comes out flush with the plastic moulding and assists the removal of the paper backing. Another way of improving the bond between the plastic moulding and the metal pattern is to use a metal-to-plastic cement in or as the ink. This may be done by dusting an adhesive powder over the print while the ink is still wet; the ink may be of a nature to react with the powder. "Araldite" and "Redux" materials, for instance, constitute suitable cements for this purpose.

The steps of the described process are illustrated somewhat diagrammatically in the accompanying drawings, in which:

Figure 1 is a sectional view on an enlarged scale of the metal foil secured to the paper backing, Figure 2 is a sectional view of the composite strip shown in Figure 1 after etching, Figure 3 is a sectional view of the same composite strip after a layer of gum arabic has been applied, Figure 4 is a sectional view of the final product after the moulding operation and after the paper backing has been removed, and Figure 5 is an enlarged plan view through the adhesive layer of Figure 1.

In the drawings 1 represents the metal foil, 2 the paper etch-resistant ink resist, 6 the gum arabic film, 7 the synthetic plastic material used in the moulding operation, and in Figure 5 the dotted line 8 represents the outline of a pattern to be formed in the metal foil.

What I claim as my invention and desire to secure by Letters Patent is:

1. In the manufacture of a printed circuit product in form of an insulation backed electrically conductive pathway pattern, the steps of joining one side of a metal sheet to a temporary support sheet by an adhesive layer including at least two different adhesive materials, one of said materials being resistant to chemical attack by an agent capable of chemically attacking the metal sheet material but sensitive to heat and the other material being resistant to heat but sensitive to attack by said chemical agent, the said layer being formed by applying one of the adhesive materials in form of discrete particles to one of said sheets and by filling within the thickness of said layer the interstices between the discrete particles with the other material whereby each material substantially extends through the thickness of said adhesive layer and provides adhesion between the two sheets independent one from the other, subjecting the metal sheet to chemical action for producing therefrom the desired pathway pattern by removing the areas of the metal sheet other than those forming part of the pathway pattern, covering the exposed side of the remaining metal sheet areas with an insulation layer by application of heat, the said layer forming a permanent support base, and removing the temporary sheet thereby transferring the metal sheet from its temporary base to a permanent support.

2. In the manufacture of a printed circuit product wherein electrically conductive pathways are formed by chemical and heat treatment from a composite sheet composed of a metal layer and a support layer adhered to each other, the steps of coating spaced apart areas of one of said layers with an adhesive material adhering to the respective layer, filling the spaces between said areas up to the level of the coating with another adhesive material adhering to the respective layer thereby forming an adhesive layer with a substantially flush adhesive surface including both adhesive materials, one of said materials being resistant to said heat treatment and the other to said chemical treatment, and adhering the other layer to said flush adhesive surface to provide adhesion between the conductive layer and the support layer through both adhesive materials independent one from the other.

3. A method as claimed in claim 2 in which the support consist of a strip of fibrous material which is porous at least during part of the process of manufacture.

4. A method as claimed in claim 3 in which at least one adhesive substance is applied in liquid form and volatile constituents thereof escape through the pores of the support as the adhesive substance solidifies.

5. A method as claimed in claim 2 in which the support is fibrous and subsequently impregnated with an impregnant which is capable of withstanding the chemical action of electrolytes used to treat the metal layer and which constitutes part of the adhesive layer.

6. A method as claimed in claim 5 in which the fibrous support is subsequently impregnated with an adhesive substance which is capable of acting as a mould release agent for sealing the pores of the support against penetration by a plastic material during a plasic moulding operation for transferring the metal layer from the fibrous support to a moulded plastic support.

7. A method as claimed in claim 2, which includes protecting areas of the layer to which one of the said adhesive substances is to be applied, by a coating which repels this specific adhesive substance, so that in these areas the adhesive layer will not contain this adhesive substance.

8. A method as claimed in claim 7 in which the protective coating is removed after application of the said adhesive substance, by treating the adhesive layer with an agent which removes the protective coating but not the said adhesive substance.

9. In the manufacture of a printed circuit product wherein electrically conductive pathways are formed by chemical and heat treatment from a composite sheet composed of a metal layer and a support layer adhered to each other, the steps of coating one of said layers with adhesive material in form of discrete particles adhering to the said layer, filling the interstices between said particles with another adhesive material so as to form an adhesive layer having a substantially flush surface including both adhesive materials, one of said adhesive materials being resistant to said heat treatment and the other to said chemical treatment, and adhering the other layer to said flush adhesive surface thereby providing adhesion between the conductive layer and the support layer through both adhesive materials independent one from the other.

10. A method as claimed in claim 9 in which the discrete particles are formed by applying a spray of the adhesive substance in the form of a liquid of such high viscosity that under the spraying conditions employed it does not form a coherent film.

11. A method as claimed in claim 9 in which the discrete particles are formed by applying the adhesive substance as a liquid film which is so thin that it is unstable and breaks up into discrete particles.

12. A method as claimed in claim 9 in which the discrete particles are formed by dispersing the adhesive substance in a volatile medium in which it is insoluble, controlling the conditions of dispersion so that the adhesive particles in the dispersion are of the required size, coating the dispersion over the surface to which the adhesive layer is to be applied, and allowing the volatile medium to evaporate.

13. A method as claimed in claim 9 in which the adhesive layer is to be applied to the metal layer, which method comprises first treating the metal surface of the said layer so that it becomes repellent to at least one of the adhesive substances to be applied thereto, whereby when this substance is applied it is forced into the desired globular structure by surface tension effects.

14. A method as claimed in claim 9, in which the adhesive substance in the form of discrete particles is heat-resistant while the other adhesive substance is resistant to electrolytes used for treating the metal layer.

15. A method as claimed in claim 14 in which the heat-resistant adhesive substance is susceptible to attack by the electrolyte.

16. A printed electric circuit product comprising a conductive layer, a supporting layer and an adhesive layer therebetween providing adhesion between the conductive layer and the supporting layer, said adhesive layer being composed of two adhesives, one being an insulating electrolyte resistant adhesive and the other an insulating heat-resistant adhesive, one forming a number of discrete portions and the other filling the spaces between said portions within the thickness of the adhesive layer both adhering to the conductive layer and to the supporting layer, each adhesive thereby providing adhesion between the conductive layer and the supporting layer independent of the other adhesive.

17. A printed electric circuit product as claimed in claim 16 in which the supporting layer is of fibrous insulating material.

18. A printed electric circuit product as claimed in claim 16 in which the supporting layer is impregnated with an adhesive sealing the pores of the supporting layer to prevent penetration by a plastic material during a plastic molding operation for transferring the conductive layer from the supporting layer to a molded plastic support.

19. A printed electric circuit product as claimed in claim 16 in which one of the adhesives is in the form of discrete globules.

20. A printed electric circuit product as claimed in claim 19 in which the adhesive in globular form is the heat resistant adhesive.

21. A printed electric circuit product as claimed in claim 16 in which the heat-resistant adhesive is of a kind susceptible to attack by acid.

22. A printed electric circuit product comprising a conductive layer, a supporting layer and an adhesive layer therebetween providing adhesion between the conductive layer and the supporting layer, said adhesive layer being composed of two adhesives, one being an insulating acid-resistant matrix and the other being in the form of discrete heat-resistant particles embedded in the matrix, both of which adhesives extending in parallel from the conductive layer to the supporting layer and each of which providing adhesion between the conductive layer and the supporting layer independently of the other.

References Cited in the file of this patent

UNITED STATES PATENTS

| | | |
|---|---|---|
| 2,300,224 | Humphner | Oct. 27, 1942 |
| 2,328,066 | Drew | Aug. 31, 1943 |
| 2,385,319 | Eustis | Sept. 18, 1945 |
| 2,602,731 | Nierenberg | July 8, 1952 |
| 2,607,825 | Eisler | Aug. 19, 1952 |
| 2,626,206 | Adler et al. | Jan. 20, 1953 |